United States Patent Office 3,636,021
Patented Jan. 18, 1972

3,636,021
TETRAMETHYL LEAD MANUFACTURE
Denis Lamarche and Maurice Decarie, Montreal, Quebec, Canada, assignors to Miranda Inc., Apartado, Panama
No Drawing. Filed Nov. 17, 1969, Ser. No. 877,522
Int. Cl. C07f 7/24
U.S. Cl. 260—437 R
6 Claims

ABSTRACT OF THE DISCLOSURE

A process for producing tetramethyl lead comprising reacting a Pb-Na alloy and methyl chloride in the presence of a catalyst comprising an amide of a metal of Group I or Group II of the Periodic System. Preferably the metal amide is suspended in toluene or can be in solid or powder form. The catalyst additionally comprises a hydrocarbon such as cumene, phenyl acetylene or cyclopentadiene.

---

This invention relates to a novel process for industrial production of tetramethyl lead.

As known, the metalorganic compounds of lead are mainly prepared by reacting a lead-sodium alloy, such as Pb-Na, with the corresponding alkyl halides, preferably chlorides.

For preparing tetraethyl lead, the reaction proceeds without need for particular catalysts, while for preparing tetramethyl lead it is necessary to react the reagent compound (Pb-Na alloy and methyl chloride) in the presence of particular catalytic systems.

Among these compounds, tetraethyl lead has been found to be the best antiknock for internal combustion engine gasoline and it has been widely used for this purpose for a long time, whereas the use of tetramethyl lead is comparatively more recent and provides, for some types of gasoline, more particular favourable effects.

For the industrial production of tetramethyl lead various types of catalysts are used, that is the organometallic compounds of Al of the $R_2Al$ type (as disclosed in U.S.A. Pat. No. 3,226,409) or the halogenated compounds thereof of the $Al_2R_3Cl_3$ type, along with co-catalysts, such as various ethers (as disclosed in U.S.A. Pat. No. 3,226,408) or polyglycol ethers (as in U.S.A. Pat. No. 3,322,685), or ammonia with traces of hydroxyl compounds (as in U.S.A. Pat. No. 3,281,442) or derivatives thereof, such as amines (as in U.S.A. Pat. No. 3,408,375 and 3,188,334). Metalorganic compounds of Al may also be produced "in situ" by adding $AlCl_3$ to the reaction mass and possibly also adding metal Al and other metalorganic compounds also of other metals, such as Pb (as disclosed in U.S.A. Pat. No. 3,048,610), capable of acting also with the Al salt, providing the metalorganic compounds of Al.

As previously stated, small amounts of co-catalysts are also added, generally polyglycol ethers, dioxane or the like (as disclosed in the U.S.A. Pat. No. 3,188,332 and 3,338,842).

However, when using such catalysts serious drawbacks arise, namely the high operating pressures, and, above all, the risk in handling the various Al-alkyls which are spontaneously inflammable in the air. This risk is also exhibited by the reaction mass which, as containing such compounds, is also self-inflammable.

The catalysts of the ammonia and amine type allow lower operating pressures and temperatures, but have a serious drawback due to the side reaction between $NH_3$, amines and MeCl forming solid compounds, such as $NH_4Cl$ and the like, during the production process.

Such compounds deposit on the various colder parts of the apparatus, obstructing the pipes and causing a serious overpressure risk.

Moreover, the use of a hydroxylated compound, the OH group of which reacts with the Pb-Na alloy providing the RONa compound, wherein R is the alkyl or aryl group bonded to the hydroxyl, causes a reduction in tetramethyl lead, since some of sodium in the alloy will be wasted, in respect of the alkylation reaction due to this secondary reaction.

Next, the RONa compound being formed as abovementioned, further reacts with the methylating agent, according to the well known Williamson's reaction, providing a R—O—R' ether; thus, in addition to wasting some of the methylating agent, a new product is simultaneously formed and later present in the reactor exhaust gasses, such gasses mostly comprising the excess methylating agent which is to be recovered. When using methanol as hydroxylated compound, the presence of these new products, such as dimethyl ether, would complicate the purification and recovery processes for the excess methylating agent.

The object of the present invention is a novel process avoiding the abovementioned drawbacks, by providing a reaction development at still lower pressures and with equal or improved yields, simultaneously avoiding the formation of solid compounds due to the abovementioned side reaction. We have found that the abovedescribed drawbacks may be removed, while obtaining similar or even higher tetramethyl lead yields, by using a novel catalytic system.

This system consists of using, as a catalyst for the methylating reaction of the Pb-Na alloy, an amide of a metal in the I or II Group of the Periodic System together with small amounts of a hydrocarbon compound, containing at least one hydrogen atom per molecule, bonded to a carbon atom, such as to have an acidic character due to the presence of adjacent multiple bonds, or other particular organic groups.

Among the amides, sodium amide $NaNH_2$, potassium amide $KNH_2$, lithium, rubidium and cesium amides, alkaline-earth metal amides, such as $Ba(NH_2)_2$ and $Mg(NH_2)_2$, are mentioned.

The hydrocarbons with the characteristic of having one atom of "acidic" hydrogen may pertain to several classes of organic compounds such as:

(a) Acetylene hydrocarbons, such as acetylene, methyl acetylene, isobutyl acetylene, phenyl acetylene.

(b) Diene hydrocarbons, either of the open chain or cyclic type, such as butadiene, 2-methyl butadiene, cyclopentadiene.

(c) Hydrocarbons containing benzene nuclei, such as fluorene, indene, triphenylmethane, isopropylbenzene and the like.

By using the above catalytic system, that is the union of an amide of a metal of the I or II Group in the Periodic System with a small amount of one of the hydrocarbons in the above specified classes, we have found that tetramethyl lead yields can be obtained as high as those obtained using the catalysts described in the abovementioned patents, operating under pressure and temperature conditions even more favourable than those previously used.

Moreover, one of the major advantages of our discovery is that the use of the instant catalytic system does not provide solid deposits in the pipe and various parts of the plant.

Further to these advantages we have found that the catalytic system of the invention provides higher yields with respect to the amount of sodium in the Pb-Na alloy, as no waste of sodium occurs by reaction with the components of the catalytic system.

Finally, the hydrocarbon being added as a component in the catalytic system may be readily recovered from the reaction products and reused in a next operation, this being a substantial economic advantage. The process may be conducted either as a batch or as a continuous operation, by using NaNH₂, both as a solid and more conveniently as dispersed in an organic solvent, such as toluene of commercial grade, as a suspension which can be easily transferred to autoclave by means of a pump or other equivalent means.

Particularly initially, this organic solvent will promote a smoother reaction by dissolving methyl chloride, thus reacting at a lower concentration, as well as reducing the vapour pressure for said methyl chloride. The methyl chloride of a commercial grade may be charged initially for all the required amount into the autoclave, while the catalyst, as suspended, is instead introduced by small amounts and sufficiently for sustaining the reaction.

EXAMPLE 1

1,000 parts of Pb-Na alloy as a coarse powder or chips, 480 parts methyl chloride of commercial grade, 40 parts NaNH₂ suspended in toluene and 50 parts cumene are charged into a suitable reaction apparatus provided with a heating shell, stirrer, reflux condenser and fitted with all of the adjusting and controlling apparatus.

The apparatus is heated at 50° C. and the reaction continued for 1½ hours. The maximum pressure is 12 atm.

After this period of time, excess methyl chloride is degassed and the reaction mass delivered to a still containing about 1,000 parts of water and stripped in a vapour stream.

Thus, tetramethyl lead is obtained with 82% yields over the reacted sodium.

EXAMPLE 2

Under the same conditions as in the preceding example, Pb-Na alloy, methyl chloride and sodium amide are introduced. 40 parts phenyl acetylene are also introduced.

The reaction is conducted under the same conditions as in Example 1. Tetramethyl lead being obtained is about 88% over the reacted sodium.

EXAMPLE 3

Under the same conditions as in the preceding examples, Pb-Na alloy, methyl chloride and sodium amide are introduced. 42 parts cyclopentadiene are also introduced.

The reaction is conducted under the same conditions as in the preceding examples and following distillation tetramethyl lead being obtained is 92% as calculated over the reacted sodium.

What is claimed is:

1. A process for producing tetramethyl lead comprising reacting a Pb-Na alloy and methyl chloride in the presence of a catalyst comprising an amide of a metal of Group I or Group II of the Periodic System and a hydrocarbon compound comprising at least one hydrogen atom per molecule bonded to a carbon atom to give it an acidic property.
2. A process according to claim 1, wherein the "acidic" hydrogen-containing hydrocarbon is cumene.
3. A process according to claim 1, wherein the "acidic" hydrogen-containing hydrocarbon is phenyl acetylene.
4. A process according to claim 1, wherein the "acidic" hydrogen-containing hydrocarbon is cyclopentadiene.
5. A process according to claim 1, wherein the catalytic system comprises a metal amide suspended in toluene.
6. A process according to claim 1, wherein said metal amide is in the form of a solid or powder.

References Cited

UNITED STATES PATENTS

| | | | |
|---|---|---|---|
| 2,621,200 | 12/1952 | Kolka et al. | 260—437 R |
| 2,657,225 | 10/1953 | Whitman | 260—437 R |
| 3,281,442 | 10/1966 | Pedrotti et al. | 260—437 R |
| 3,401,187 | 9/1968 | Pedrotti | 260—437 R |
| 3,539,607 | 11/1970 | Psarras | 260—437 R |

OTHER REFERENCES

Gilman et al.: J. Org. Chem., vol. 18, pp. 1675-78, 1953.

TOBIAS E. LEVOW, Primary Examiner

H. M. S. SNEED, Assistant Examiner